US006961375B1

(12) United States Patent
Mihara

(10) Patent No.: US 6,961,375 B1
(45) Date of Patent: *Nov. 1, 2005

(54) PICTURE CODING DEVICE AND METHOD, PICTURE TRANSMITTING DEVICE AND METHOD AND RECORDING MEDIUM

(75) Inventor: Kanji Mihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/018,416

(22) Filed: Feb. 4, 1998

(30) Foreign Application Priority Data

| Feb. 6, 1997 | (JP) | .................................. P09-023425 |
| Feb. 20, 1997 | (JP) | .................................. P09-035900 |

(51) Int. Cl.$^7$ .............................................. H04N 7/12
(52) U.S. Cl. ............ 375/240.01; 375/240; 375/240.02; 375/240.12
(58) Field of Search .............................. 348/419, 405, 348/401; 375/240, 240.01, 240.12, 240.02, 240.03

(56) References Cited

U.S. PATENT DOCUMENTS

| 4,093,962 | A | * | 6/1978 | Ishiguro et al. ............. 348/419 |
| 5,025,482 | A | * | 6/1991 | Murakami et al. ........... 348/419 |
| 5,089,888 | A | * | 2/1992 | Zdepski et al. .............. 348/419 |
| 5,410,351 | A | * | 4/1995 | Kojima ........................ 348/401 |
| 5,473,377 | A | * | 12/1995 | Kim .............................. 348/405 |

FOREIGN PATENT DOCUMENTS

EP  0 514 663 A2  4/1992

* cited by examiner

Primary Examiner—Allen Wong
(74) Attorney, Agent, or Firm—Frommer Lawrence & Haug LLP; William S. Frommer

(57) ABSTRACT

In a quantizing circuit 15, DCT coefficients output from a DCT circuit 14 are quantized with the quantizing step corresponding to a quantizing index supplied from a quantizing index determining circuit 25. In the quantizing index determining circuit 25, the quantizing index is determined on the basis of a first variable corresponding to an occurrence code amount as a data accumulative amount of a buffer 17 and a second variable corresponding to the activity of macroblocks output from an activity detection circuit 24. In this case, the quantizing index determining circuit 25 adaptively sets a fixing mode for fixing the first variable or a variable mode for making variable the

3 Claims, 11 Drawing Sheets

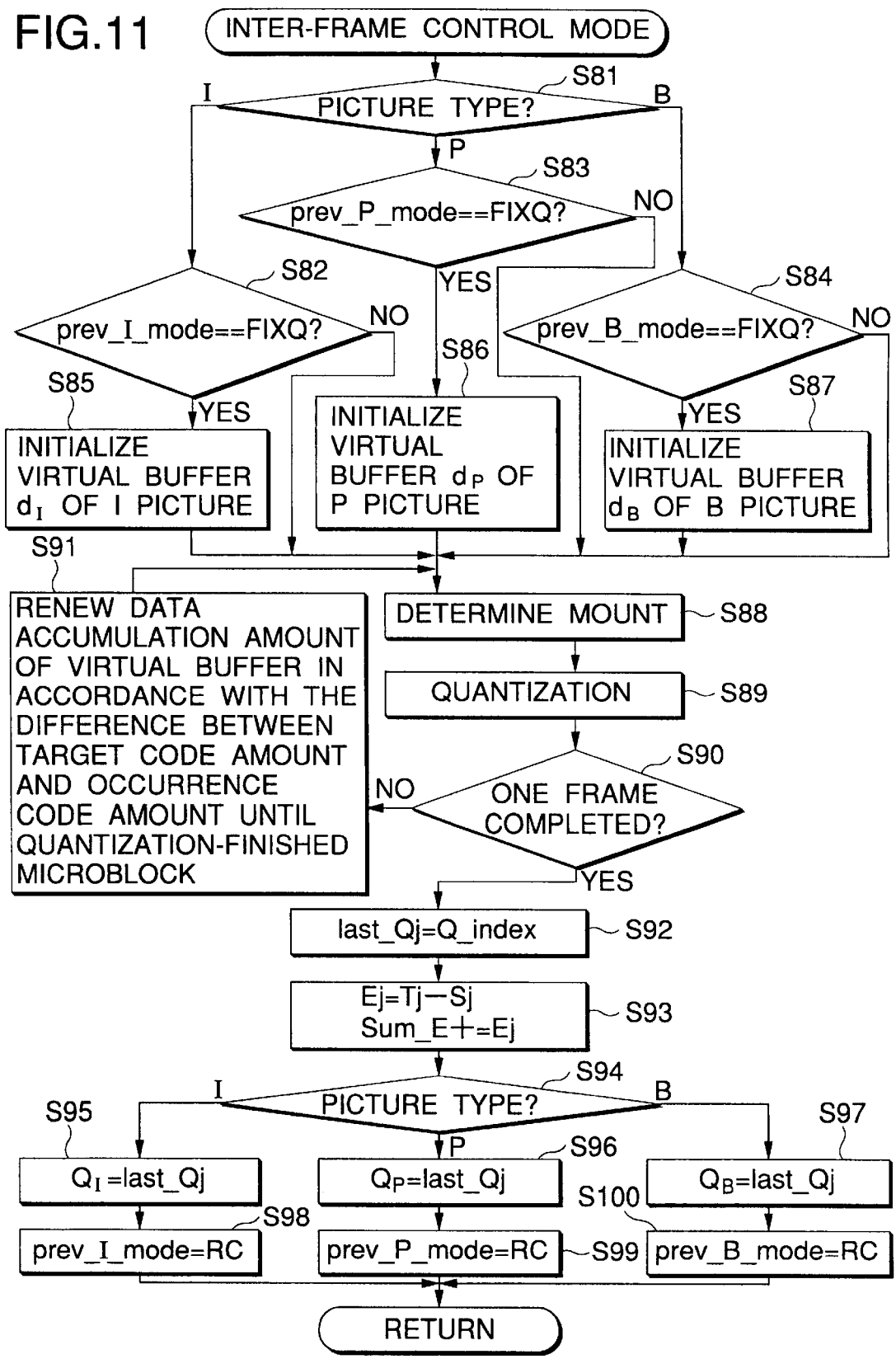

PICTURE CODING DEVICE AND METHOD, PICTURE TRANSMITTING DEVICE AND METHOD AND RECORDING MEDIUM

BACKGROUND OF THE INVENTION

The present invention relates to a picture coding device and a picture coding method, a picture transmitting device and a picture transmitting method, and a recording medium, and particularly to a picture coding device and a picture coding method, a picture transmitting device and a picture transmitting method, and a recording medium which can prevent deterioration of picture quality of decoded pictures.

TM5 (Test Model 5 (Test Mode 1 Editing Committee: "Test Model 5", ISO/IEC JTC/SC29/WG11/NO400 (April 1993))) has been known as one of algorithms to gain a decoded picture with high picture quality, for example, in such a case that a picture is compressed and coded according to MPEG (Moving Picture Experts Group) system or the like. TM5 comprises three steps, and the following processing is performed in each step.

[Step 1]

A target code amount of a frame to be currently encoded is set on the basis of the complexity of the same type of frame which was previously encoded.

[Step 2]

A data storage amount of a virtual buffer to manage the difference between the target amount and the occurrence code amount every picture type is fed back, and on the basis of the data accumulation amount thereof a temporary quantizing index is set for a macroblock to be next encoded so that the actual occurrence code amount is coincident (substantially coincident) with the target code amount which is set in step 1.

[Step 3]

The quantizing index is finally determined on the basis of the complexity of a macroblock which is an encode target so that a visual characteristic, that is, the picture quality of the decoded picture is enhanced.

Accordingly, in the case of TM5, if something corresponding to the activity of a picture is used as a variable P which varies in accordance with the complexity of the picture and something corresponding to the temporary quantizing step which is determined from the data accumulation amount of the virtual buffer is used as a variable Q to make the occurrence coded amount coincident with the target code amount, the final quantizing index MQUANT for quantizing the macroblock is determined according to the following equation.

$$MQUANT=f(P, Q)$$

wherein f (P, Q) is a function of normalizing the values corresponding to the arguments P, Q to values within a predetermined range and outputting the normalized values.

As described above, in the TM5, the quantizing index is determined by the variable P corresponding to the complexity of the picture and the variable Q for making the occurrence code amount coincident with the target code amount, and the quantization is performed with the quantizing step corresponding to the quantizing index.

Therefore, when the occurrence code amount is not coincident with the target code amount although the complexity of macroblocks constituting the picture of a frame is identical, the quantizing step may be changed, resulting in deterioration of the picture quality of the decoded picture.

That is, when the complexity of the macroblocks constituting one frame is identical, it is preferable that all the macroblocks are quantized with the same quantizing step. In this case, if a macroblock is quantized with a quantizing step different from that of the surrounding macroblocks, the portion of the macroblock which is quantized while the quantizing step is varied becomes remarkable in the decoded picture.

Such a so-called block-type noise appears more remarkably when the quantizing step is varied in a small value range. That is, when the quantizing step is varied in the range between 7 and 8 which are relatively large values, the variation rate is equal to about 1/7 and 1/8. On the other hand, when the quantizing step is varied in the range between 3 and 4 which are small values, the variation rate is equal to 1/3 and 1/4 which are large values. Accordingly, when a quantizing step which is used for the quantization of macroblocks having the same complexity is varied in a small range, there appears remarkably the difference in picture quality between a macroblock quantized with a large quantizing step and a macroblock quantized with a small quantizing step.

Further, when a picture is subjected to MPEG coding, DCT coefficients are weighted (gradient) with a quantizing matrix in the quantization process from the viewpoint that high-order DCT coefficients are not important. That is, the high-order DCT coefficients are quantized with a larger quantization value than low-order DCT coefficients. Accordingly, with respect to the high-order DCT coefficients which are quantized with a larger quantizing value than the low-order DCT coefficients, even when the quantizing step is varied not in a small value range, but in a relatively large value range, one-step variation of the quantizing step has a large effect on the quantization value used for the quantization, resulting in deterioration of picture quality.

In view of the foregoing, there is a method of coding (encoding) a picture while fixing the quantizing step. However, in this method, when complicated pictures are sequential, the occurrence code amount is extremely increased, and a VBV (Video Buffering Verifier) buffer suffers underflow.

SUMMARY OF THE INVENTION

An object of the present invention is to encode a picture without deterioration of picture quality of a decoded picture while satisfying conditions imposed by a VBV buffer.

A picture coding method and a picture coding device according to the present invention are characterized in that a quantizing step is set on the basis of a first variable to make coincidence between an occurrence code amount of coded data of a picture and a prescribed target code amount, and a second variable corresponding to complexity of the picture, and the first variable is set to a fixed value during a coding processing of the picture of one frame.

A picture transmitting method and a picture transmitting device according to the present invention are characterized in that coded data are obtained by setting a quantizing step on the basis of a first variable to make coincidence between an occurrence code amount of coded data of a picture and a prescribed target code amount and a second variable corresponding to complexity of the picture, and setting the first variable to a fixed value during a coding processing of the picture of one frame.

On a recording medium according to the present invention are recorded coded data which are obtained by setting a quantizing step on the basis of a first variable to make an occurrence code amount of coded data of a picture coincident with a prescribed target code amount and a second variable corresponding to complexity of the picture and setting the first variable to a fixed value during a coding processing of the picture of one frame.

A picture coding device and a picture coding method according to the present invention are characterized in that when a quantizing step is set on the basis of a first variable to make coincidence between an occurrence code amount of coded data of a picture and a prescribed target code amount in a process of quantizing an orthogonal transform coefficients with the quantizing step, a fixing or variable mode for setting the first variable to a fixed or variable value is adaptively set during a coding processing of the picture of one frame.

A picture transmitting device and a picture transmitting method according to the present invention are characterized in that coded data are obtained by adaptively setting a fixing or variable mode for setting a first variable to a fixed or variable value during a coding processing of the picture of one frame when a quantizing step is set on the basis of the first variable for making coincidence between an occurrence code amount of coded data of a picture and a prescribed target code amount in a process of quantizing an orthogonal transform coefficients with the quantizing step.

On a recording medium according to the present invention are recorded coded data which are obtained by adaptively setting a fixing or variable mode for setting a first variable to a fixed or variable value during a coding processing of the picture of one frame when a quantizing step is set on the basis of the first variable for making coincidence between an occurrence code amount of coded data of a picture and a prescribed target code amount in a process of quantizing an orthogonal transform coefficients with the quantizing step.

BRIEF DESCRIPTION OF THE DRAWINGS

FIG. 11 is a flowchart showing the detailed processing of an in-frame control mode in step S47 of FIG. 9.

DETAILED DESCRIPTION OF THE PREFERRED EMBODIMENTS

Preferred embodiments according to the present invention will be described hereunder with reference to the accompanying drawings.

Figure 1:
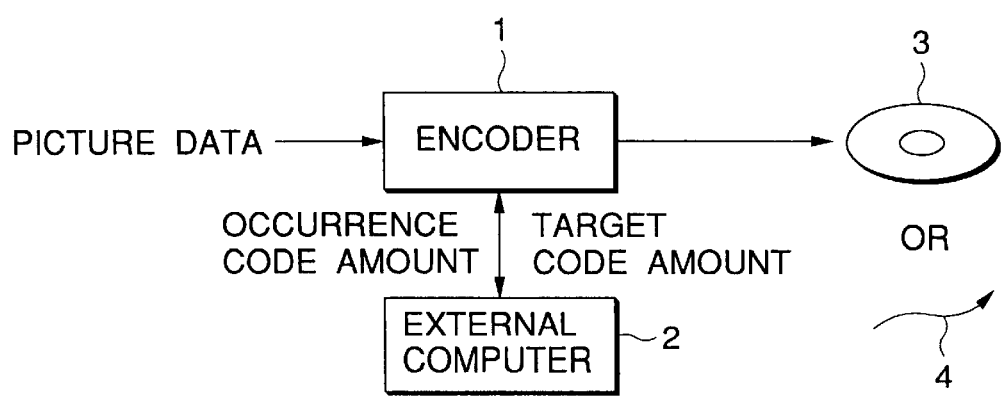
FIG. 1 is a block diagram showing the construction of an embodiment of a picture coding device according to the present invention.

FIG. 1 shows the construction of an embodiment of a picture coding device according to the present invention.

In the picture coding device according to the first embodiment, a picture is encoded at a variable rate according to the MPEG system by a so-called 2-path coding method, and thus the picture coding device of this embodiment is applicable to authoring system such as a DVD (Digital Versatile Disc), a video CD (Compact Disc) or the like, and other systems.

The picture data to be encoded are input to an encoder 1, and the encoder 1 orthogonally transforms the picture data to at least orthogonal transform coefficients such as DCT coefficients, and then quantizes the orthogonal transform coefficients to encode the picture data.

That is, in a first path, the encoder 1 quantizes the picture data with a fixed quantizing step to encode the picture data, and outputs the occurrence code amount of the coded data thus obtained (or coding difficulty (difficulty) of the picture data as information corresponding to the occurrence code amount, for example) to an external computer 2. The external computer 2 sets a target code amount every 1GOP (Group Of Picture) or every frame (one frame or one field) on the basis of the occurrence code amount from the encoder 1.

In a second path, the external computer 2 supplies the set target code amount to the encoder 1, and the encoder 1 encodes the picture data while setting the quantizing step so that the occurrence code amount is coincident with the target code amount. The quantizing step is also set on the basis of a past occurrence code amount, a data accumulation amount in the VBV buffer, the complexity of the picture, etc. as well as the target code amount.

The coded data which are obtained by the coding in the second path are recorded on a recording medium 3 such as an optical disc, a magnetooptical disc, a magnetic tape or the like, or the coded data are transmitted through a transmission path 4 such as ground wave, a satellite line, a CATV network, the internet or the like.

Figure 2:
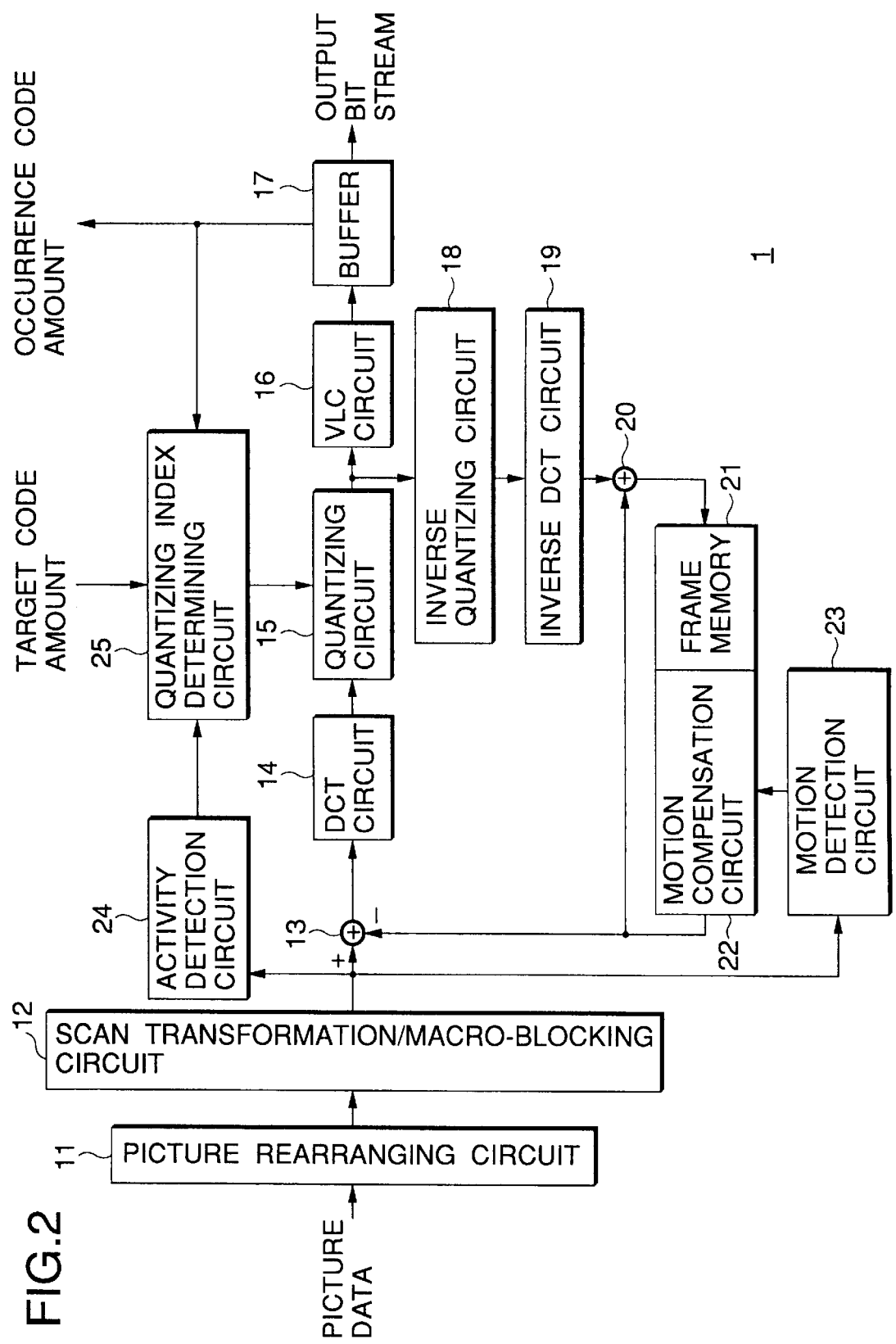
FIG. 2 is a block diagram showing the construction of an encoder 1 of FIG. 1.

FIG. 2 shows the construction of the encoder 1 of Fig. 1.

In FIG. 2, the picture is encoded according to the MPEG system in the encoder 1.

That is, the picture data to be encoded are supplied to a picture rearranging circuit 11. The picture rearranging circuit 11 changes the arrangement of frames (or fields) of the input picture data if necessary, and outputs them to a scan transform/macroblocking circuit 12. That is, the picture data of each frame are processed as any one of an I-picture, a P-picture and a B-picture. For example, there is a case where the processing of a B-picture needs an I-picture or a P-picture which are subsequent to the B-picture on time axis, and the I-picture or the P-picture must be processed before the B-picture. Therefore, the picture rearranging circuit 11 is designed to change the arrangement of the frames so that the timely subsequent frames are processed before.

It is predetermined that the picture of each of sequentially-input frames is processed as which one of I-picture, P-picture and B-picture.

The picture data which are rearranged in the picture rearranging circuit 11 are output to the scan transform/ macroblocking circuit 12 to perform the scan transform processing and the macroblocking processing on the picture data. The macroblock thus obtained is output to a calculator 13, a motion detection circuit 23 and an activity detection circuit 24.

The motion vector detection circuit 23 detects a motion vector of a macroblock which is supplied from the scan transform/macroblocking circuit 12.

That is, the motion vector detection circuit 23 refers to a predetermined reference frame to perform pattern matching (block matching) between the reference frame and the macroblock from the scan transform/macroblocking circuit 12, thereby detecting the motion vector of the macroblock.

Therefore, in the case of the MPEG system, there are four kinds of picture predictive modes, an intra-coding (intra-frame coding) mode, a forwardly predictive coding mode, a backwardly predictive coding mode and a bidirectionally predictive coding (three predictive coding modes of the forwardly, backwardly and bidirectionally predictive coding modes are called as inter-coding in contrast to the intra-coding. The I-picture is subjected to the intra-coding, the P-picture is subjected to the intra-coding or the forwardly predictive coding, and the B-picture is subjected to the intra-coding, the forwardly predictive coding, the backwardly predictive coding or the bidirectionally predictive coding.

That is, the motion vector detection circuit 23 sets the intra-coding mode as a predictive mode for the I-picture. In this case, no detection of the motion vector is performed in the motion vector detection circuit 23.

The motion vector detection circuit 23 performs the forwardly predictive coding on the P-picture to detect the motion vector thereof. Further, the motion vector detection circuit 23 compares a predictive error caused by the execution of the forwardly predictive coding with the dispersion of macroblocks (macroblocks of a P-picture) serving as coding targets, for example. If the dispersion of the macroblocks is smaller than the predictive error, the intra-coding mode is set as the predictive mode. Further, if the predictive error caused by the execution of the forwardly predictive coding is smaller, the motion vector detection circuit 23 sets the forwardly predictive coding mode as the predictive mode and outputs the detected motion vector to a motion compensation circuit 22.

Further, the motion vector detection circuit 23 performs the forwardly predictive coding, the backwardly predictive coding and the bidirectionally predictive coding on the B picture to detect the motion vectors thereof. Further, the motion vector detection circuit 23 detects the minimum predictive error of the predictive errors in the forwardly predictive coding, the backwardly predictive coding and the bidirectionally predictive coding (hereinafter suitably referred to as minimum predictive error), and compares the minimum predictive error with the dispersion of the macroblocks serving as the coding target (macroblocks of a B picture). As a result of the comparison, if the dispersion of the macroblocks is smaller than the minimum predictive error, the motion vector detection circuit 23 sets the intra-coding mode as the predictive mode. Further, if the minimum predictive error is smaller, the motion vector detection circuit 23 sets as the predictive mode the predictive mode in which the minimum predictive error is obtained, and outputs the corresponding motion vector to the motion compensation circuit 22.

Upon receiving the motion vector, on the basis of the motion vector, the motion compensation circuit 22 reads picture data stored in a frame memory 21, which are encoded and already locally decoded, and supplies the read-out picture data as a predictive picture to the calculators 13 and 20.

The calculator 13 calculates the difference between the macroblock from the scan transform/macroblocking circuit 12 and the predictive picture from the motion compensation circuit 22. The difference value is supplied to a DCT circuit 14 (orthogonal transform means).

When the intra-coding mode is set as the predictive mode in the motion vector detection circuit 23, the motion compensation circuit 22 outputs no predictive picture. In this case, the calculator 13 (also the calculator 20) performs no processing, and directly outputs the macroblock from the scan transform/macroblocking circuit 12 to the DCT circuit 14.

In the DCT circuit 14, the DCT processing is performed on the output of the calculator 13, and the DCT coefficients thus obtained are supplied to the quantizing circuit 15 (quantizing means). In the quantizing circuit 15, the quantizing step (quantizing scale) corresponding to the quantizing index from a quantizing index determining circuit 25 (setting means) is set, and the DCT coefficients from the DCT circuit 14 are quantized with the product of the quantizing step and the coefficients of a quantizing matrix or the like. The quantized DCT coefficients (hereinafter suitably referred to as quantizing values) are supplied to a VLC unit 16.

In the VLC unit 16, the quantizing value supplied from the quantizing circuit is converted to a variable-length code such as a Haffman code, and output to a buffer 17. The buffer 17 temporarily accumulates the data from the VLC unit 16 to smoothen and output the data amount thereof. The data accumulation amount in the buffer 17 is supplied as the occurrence code amount to the external computer 2 (FIG. 1) and the quantizing index determining circuit 25.

On the other hand, the quantizing value which is output from the quantizing circuit 15 is supplied to not only the VLC unit 16, but also an inverse quantizing circuit 18. In the inverse quantizing circuit 18, the quantizing value from the quantizing circuit 15 is inversely quantized according to the quantizing step which is used in the quantizing circuit 15 to be transformed to a DCT coefficient. The DCT coefficient is supplied to an inverse DCT circuit 19. In the inverse DCT circuit 19, the DCT coefficient is subjected to the inverse DCT processing, and then supplied to the calculator 20.

The calculator 20 is supplied with not only the output of the inverse DCT circuit 19, but also the same data as the prediction picture which is supplied from the motion compensation circuit 22 to the calculator 13, and the calculator 20 adds the signal (prediction error) from the inverse DCT circuit 19 and the prediction picture from the motion compensation circuit 22 to locally decode the original picture (when the prediction mode is the intra-coding mode, the output of the inverse DCT circuit 19 is supplied through the calculator 20 to the frame memory 21). The decoded picture is the same as the decoded picture which is obtained at the reception side.

The decoded picture (locally decoded picture) which is obtained in the calculator 20 is supplied to and stored in the frame memory 21, and then it is used as the reference picture (reference frame) to a picture to be inter-coded (forwardly predictively coded, backwardly predictively coded or bidirectionally predictively coded).

Further, in the activity detection circuit 24, activity is detected as an index which represents complexity of a macroblock, and then supplied to the quantizing index determining circuit 25. The quantizing index determining circuit 25 is supplied with the target code amount from the external computer 2, the occurrence code amount from the buffer 17 and the activity from the activity detection circuit 24. On the basis of the target code amount, the occurrence code amount and the activity, the quantizing index is determined, and supplied to the quantizing circuit 15. The quantizing index has one-to-one correspondence to the quantizing step, and as described above the quantization is performed with the quantizing step corresponding to the quantizing index from the quantizing index determining circuit 25.

The quantizing index determining circuit 25 outputs the fixed quantizing index in the first path, and the quantization is performed with the fixed quantizing step in the quantizing circuit 15. In the second path, the quantizing index determining circuit 25 adaptively sets the quantizing index on the basis of the occurrence code amount from the buffer 17, the activity from the activity detection circuit 24 and the target code amount from the external computer 2, and in the quantizing circuit 15 the quantization is performed with the quantizing step corresponding to the quantizing index which is adaptively set as described above.

Next, the setting processing of the quantizing index in the quantizing index determining circuit 25 and the quantization processing in the quantizing circuit 15 which are performed in the second path will be described with reference to the flowcharts of FIGS. 3 and 4.

In the quantizing index determining circuit 25, an initial value of a quantizing index (temporary quantizing index Q_index) is first set in step S1. That is, for example, 9, 9, 11 are set as the initial values of the quantizing indexes $Q_I$, $Q_P$, $Q_B$ of I-picture, P-picture, B-picture in step S1. Further, in step S1, a variable Sum_E to keep the accumulation value of the error between the target code amount and the occurrence code amount and a variable j to count the number of frames of a coded picture are initialized to zero, for example.

When a target code amount $T_j$ for coding of a j-th frame is supplied from the external computer 2, the target code amount $T_j$ is received by the quantizing index determining circuit 25 in step S2, and then the processing goes to step S3 to judge the picture type of a frame which is a current coding target. When in step S3 the picture type of the frame of the coding target is judged as I-picture, P-picture or B-picture, the processing goes to step S4, S5 or S6 respectively to set $Q_I$, $Q_P$ or $Q_B$ to Q_index as a first variable (quantizing index) so that the occurrence code amount of the picture of the j-th frame is made coincident with the target code amount $T_j$, and then the processing goes to step S7.

In step S7, the quantizing index MQUANT for quantizing the macroblock is determined. That is, the quantizing index determining circuit 25 sets the quantizing index MQUANT of the macroblock serving as the coding target on the basis of the first variable Q_index for making the occurrence code amount coincident with the target code amount $T_j$, and the second variable corresponding to the complexity of the macroblock serving as the coding target, that is, the activity ACT from the activity detection circuit 24, and outputs the quantizing index MQUANT to the quantizing circuit 15. In the quantizing circuit 15, the value corresponding to the quantizing index MQUANT from the quantizing index determining circuit 25 is set as a quantizing step which is used to quantize the macroblock serving as the coding target.

When the quantizing step is set, the processing goes from step S7 to S8 to quantize the macroblock serving as the coding target with the quantizing step in the quantizing circuit 15, and then the processing goes to step S9. In step S9, it is judged whether the quantization of all the macroblocks constituting one frame, that is, the j-th frame is completed. If it is judged that the quantization is not completed, the processing returns to step S7, and the same processing is subsequently repeated.

That is, the quantizing index MQUANT of each macroblock is determined by Q_index and the activity ACT of the macroblock, and the same value of Q_index is used for the macroblocks constituting one frame. As described above, Q_index is set to a fixed value during the coding of one frame, and thus the quantizing index MQUANT of each macroblock which is used for the coding of one frame is varied in accordance with only the activity ACT of the macroblock serving as the coding target. That is, the quantizing index MQUANT of each macroblock varies in accordance with the complexity of the picture like the case of the step 3 of TM5 during the coding of one frame, however, it does not vary for the rate control (a control operation to make the occurrence code amount coincident with the target code amount).

Accordingly, for example, when the complexity is identical among the macroblocks constituting the picture of one frame, the quantizing index MQUANT of each macroblock, that is, the quantizing step does not vary, and thus the deterioration of the picture quality of the decoded picture can be prevented.

Here, the quantizing step does not vary for the rate control, but it varies in accordance with the complexity of the macroblock. Accordingly, in the present invention, there is also a case where a macroblock is quantized with a quantizing step which is different from that of surrounding macroblocks as in the case of the prior art. However, the variation of the quantizing step in this case corresponds to the complexity of the macroblock, so that the variation does not deteriorate the picture quality of the decoded picture, and rather it enhances the visual characteristic.

That is, in the prior art, even when the complexity is identical between macroblocks, the quantizing step for the rate control is varied and the adjacent macroblocks are quantized in different quantizing steps, so that the deterioration of the picture quality of the decoded picture occurs, for example, block-type noises are remarkable. On the other hand, in the present invention, the quantizing step is not varied for the rate control within one frame, and thus macroblocks having the same complexity are not quantized in different quantizing steps, so that the picture quality of the decoded picture can be prevented from being deteriorated.

The quantizing step does not vary for the rate control, but it varies in accordance with the complexity of the macroblock. Therefore, even when complicated pictures are sequential, it can be basically prevented that the occurrence code amount is extremely increased and the VBV buffer suffers underflow.

On the other hand, if it is judged in step S9 that the quantization of all the macroblocks constituting one frame, that is, a j-th frame is completed, the processing goes to step S10 of FIG. 4, and the average value mean_Q of the quantizing index MQUANT every macroblock which is used to quantize the macroblocks constituting the j-th frame (hereinafter suitably referred to as average quantizing index) is calculated in the quantizing index determining circuit 25. Further, the quantizing index determining circuit 25 sets the average quantizing index mean_Q to a variable mean_$Q_j$ to keep the average quantizing index of the j-th frame in step S10, and then the processing goes to step S11.

In step S11, the error $E_j$ between the target code amount $T_j$ and the occurrence code amount $S_j$ is calculated for the j-th frame, and an accumulation value (hereinafter suitably referred to as accumulative error) Sum_E is calculated. That is, in step S11, $T_j$–$S_j$ is calculated in the quantizing index determining circuit 25 in step S11, and this value is set as the error $E_j$. Further, in step S11, the error $E_j$ is added to the accumulative error Sum_E in the quantizing index determining circuit 25, and the addition result is newly set as the accumulative error Sum_E.

Then, the processing goes to step S12, and it is judged in the quantizing index determining circuit 25 whether the error $E_j$ is positive. If the error $E_j$ is judged to be positive in step S12, that is, if the occurrence code amount $S_j$ of the j-th frame is smaller than the target code amount $T_j$, the processing goes to step S13 to judge it in the quantizing index determining circuit 25 whether the accumulative error Sum_E is larger than a predetermined permissible minimum value Min_Sum_E.

Here, the permissible minimum value Min_Sum_E is used to prevent the total of the occurrence code amounts until now from being extremely larger than the total of the target code amounts, and it is preset to zero or a negative value, for example.

If it is judged in step S13 that the accumulative error Sum_E is larger than the permissible minimum value Min_Sum_E, that is, if the occurrence code amount $S_j$ of the j-th frame is smaller than the target code amount $T_j$ thereof and the error of the accumulative value of the occurrence code amounts until now from the accumulative value of the target code amounts is within a predetermined permissible range, so that it is needed to reduce the quantizing step and increase the occurrence code amount, the extent to which the quantizing step (Q_index) is reduced is judged in steps S14 to S17.

That is, in the quantizing index determining circuit 25, in step S14 Q_index is reduced by one level, and a predictive value $S'_j$ of an occurrence code amount when a (j+1)-th frame is quantized is calculated according to the following equation.

$$S'_j=(S_j \times \text{mean}\_Q_j)/(\text{mean}\_Q-1)$$

In this case, the predictive value $S'_j$ of the occurrence code amount is calculated on the assumption that so-called global complexity (multiplication of the average quantizing index of one frame and the occurrence code amount) for the j-th frame and the (j+1)-th frame is constant.

In the quantizing index determining circuit 25, it is judged in step S15 whether the predictive value $S'_j$ of the occurrence code amount is larger than the target code amount $T_j$. In step S15, the predictive value $S'_j$ of the occurrence code amount is judged not to be larger than the target code amount $T_j$, that is, if it is predicted that the occurrence code amount is smaller than the target code amount even when Q_index used to quantize the j-th frame is reduced by one step to quantize the (j+1)-th frame, the processing goes to step S16 to increment mean Q by only 1, and then the processing returns to step S14. In step S16 mean_Q is continued to be incremented until it is judged in step S15 that the predictive value $S'_j$ of the occurrence code amount is larger than the target code amount $T_j$, that is, until it can be predicted that the occurrence code amount when the quantizing step is set to mean_Q-1 and the (j+1)-th frame is quantized is not smaller than the target code amount.

Thereafter, when it is judged in step S15 that the predictive value $S'_j$ of the occurrence code amount is larger than the target code amount $T_j$, the processing goes to step S17 to calculate the difference delta Q between the quantizing step mean_Q to be used to quantize the (j+1)-th frame and the quantizing step mean_$Q_j$ used to quantize the j-th frame.

In this case, in steps S23 to 25 as described later, $Q_I$, $Q_P$ or $Q_B$ which are set to Q_index is altered by only delta Q. However, when $Q_I$, $Q_P$ or $Q_B$ is rapidly varied between the j-th frame and the (j+1)-th frame, the picture quality is sharply varied, so that an user visually feels non-smoothness.

Therefore, in step S17, the maximum value of delta Q is restricted to prevent the above disadvantage. That is, in step S17, delta Q is calculated according to the following equation.

$$\text{delta}Q=\min\{\text{max}\_\text{delta}, \text{mean}\_Q-\text{mean}\_Q_j\}$$

min { } represents the minimum value in parentheses { }. Further, max_delta represents the upper limit of deltaQ, and 2 or 3 is set to max_delta.

If it is judged in step S13 that the accumulative error Sum_E is not larger than the permissible minimum value Min_Sum_E, that is, if the occurrence code amount $S_j$ of the j-th frame is smaller than the target code amount $T_j$, but the accumulative value of the occurrence code amount exceeds the accumulative value of the target code amount, and thus the occurrence code amount should not be increased, the processing skips steps S14 to S16 and goes to step S17 to calculate delta Q as described above. That is, in this case, mean_Q-mean_$Q_j$=0 is set as delta Q.

On the other hand, if it is judged in step S12 that the error $E_j$ is not positive, that is, if the occurrence code amount $S_j$ of the j-th frame is above the target code amount $T_j$, the processing goes to step S18 to judge it in the quantizing index determining circuit 25 whether the accumulative error Sum_E is smaller than a predetermined permissible maximum value Max_Sum_E.

Here, the permissible maximum value Max_Sum_E is used to prevent the total of the occurrence code amounts until now is greatly smaller than the total of the target code amounts, and a positive value is preset to it.

If the accumulative error Sum_E is judged to be smaller than the permissible maximum value Max_Sum_E in step S18, that is, if the occurrence code amount $S_j$ of the j-th frame is above the target code amount $T_j$ thereof and th accumulative value of the occurrence code amounts until now is above the accumulative value of the target code amounts, so that it is required to increase the quantizing step and reduce the occurrence code amount, the extent to which the quantizing step (Q_index) is increased is determined in steps S19 to S21

That is, in the quantizing index determining circuit 25, in step S19 Q_index is increased by one step, and the predictive value $S'_j$ of the occurrence code amount when the (j+1)-th frame is quantized is calculated according to the following equation.

$$S'_j=(S_j \times \text{mean}\_Q_j)/(\text{mean}\_Q+1)$$

In this case, the predictive value $S'_j$ of the occurrence code amount is also calculated on the assumption that the global complexity on the j-th frame and the (j+1)th frame is constant.

In the quantizing index determining circuit 25, it is judged in step S20 whether the predictive value $S'_j$ of the occurrence code amount is smaller than the target code amount $T_j$. If it is judged in step S20 whether the predictive value $S'_j$ of the occurrence code amount is smaller than the target code amount $T_j$, that is, if it is predicted that even when Q index used to quantize the j-th frame is increased by one step to quantize the (j+)-th frame, the occurrence code amount thereof is larger than the target code amount, the processing goes to step S21 to increment mean_Q by 1, and then the processing goes to step S19. Thereafter, mean_Q is continued to be incremented in step S21 until the predictive value $S'_j$ of the occurrence code amount is judged to be smaller than the target code amount $T_j$, that is, until it is predicted that the occurrence code amount when the quantizing step is set to mean_Q+1 and the (j+1)-th frame is quantized is not larger than the target code amount.

Thereafter, it is judged in step S21 whether the predictive value S'$_j$ of the occurrence code amount is smaller than the target code amount T$_j$, the processing goes to step S17 to calculate delta Q as described above, and then the processing goes to step s22.

Figure 3:
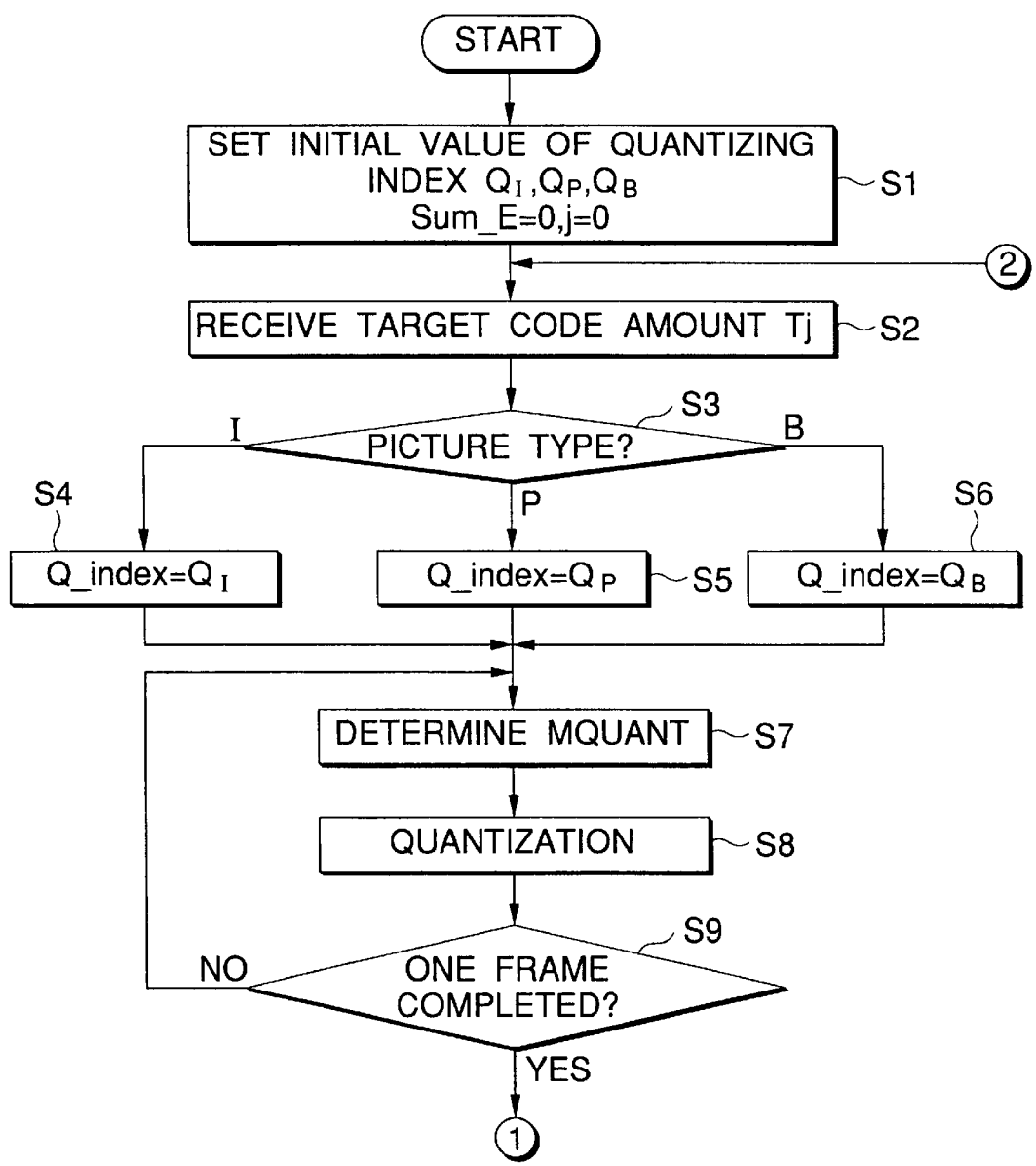
FIG. 3 is a flowchart showing the processing of a quantizing circuit 15 and a quantizing index determining circuit 25 of FIG. 2.

In step S22, the picture type of the (j+1)-th frame is judged as in the case of the step S3 of FIG. 3. If in step S22 the picture type of the (j+1)-th frame is judged as an I-picture, a P-picture or a B-picture, the processing goes to step S23, S24 or S25 respectively to add delta Q to Q$_I$, Q$_P$ or Q$_B$, and the addition value is newly set as Q$_I$, Q$_P$ or Q$_B$, thereafter the processing going to step S26.

If it is judged in step S26 whether a terminate code representing the end of picture data is received. If it is judged that the terminate code is not received, that is, if there are picture data to be encoded, the processing goes to step S27 to increment j by only 1, and the processing returns to step S2 of FIG. 3. If it is judged in step S26 that the terminate code is received, the processing is ended.

The decrement or increment of mean_Q is restricted by each judgment processing in step S15 or S20, so that the condition imposed by the VBV buffer is basically satisfied (the underflow of the VBV buffer is prevented).

Next, the construction of another embodiment of the picture coding device according to the present invention will be described with reference to FIG. 5.

The 2-path encoding is performed in the embodiment shown in FIG. 1. However, in the embodiment shown in FIG. 5, the picture coding is performed in one path by so-called feed-back type rate control.

Figure 5:
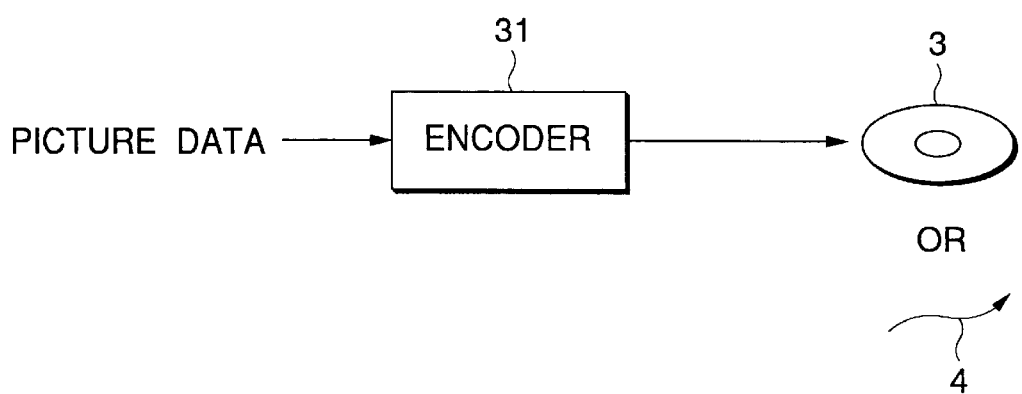
FIG. 5 is a block diagram showing the construction of another embodiment of the picture coding device of the present invention.
Figure 6:
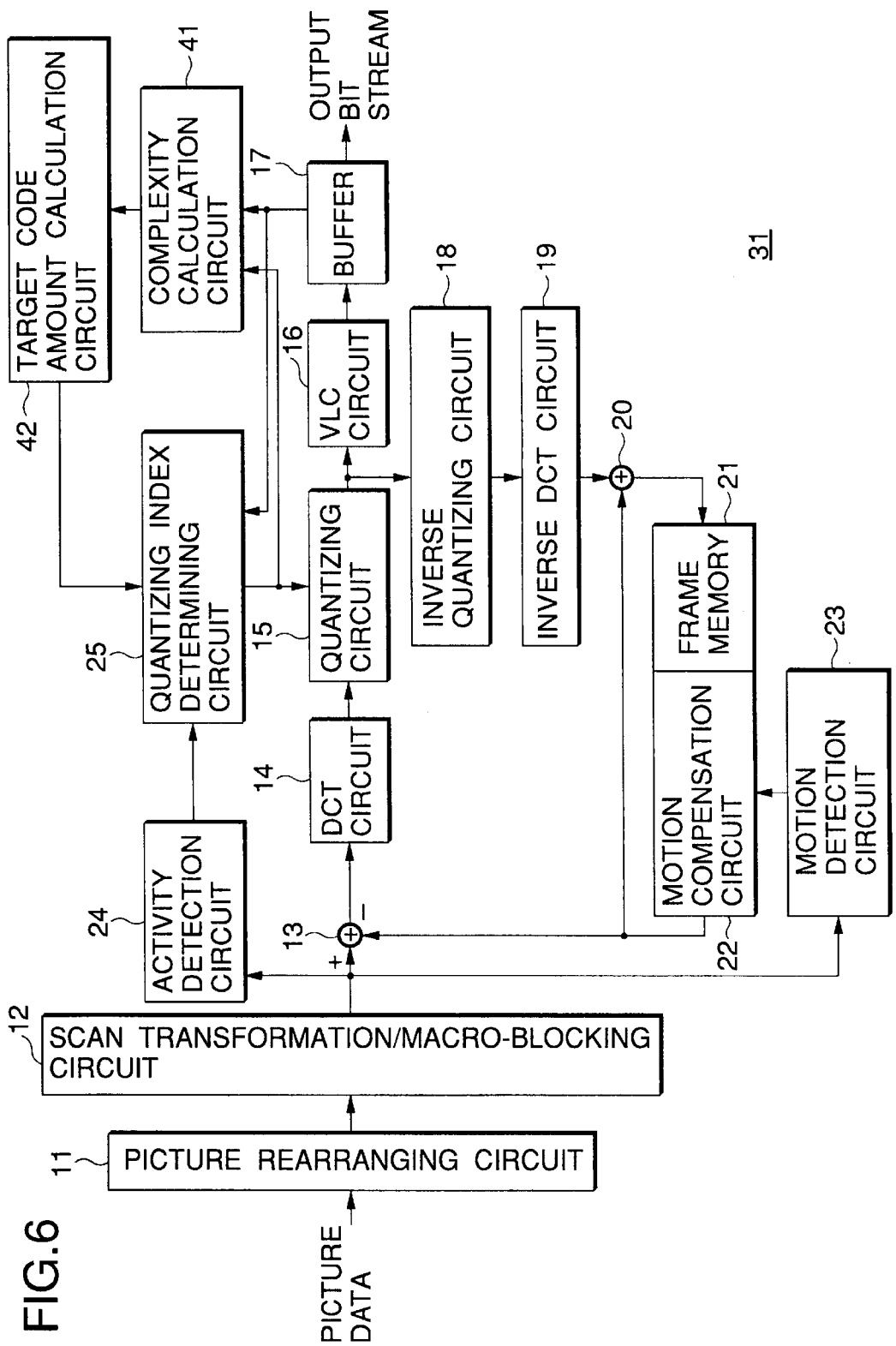
FIG. 6 is a block diagram showing the construction of an encoder 31 of FIG. 5.

FIG. 6 shows the construction of the encoder 31 of FIG. 5. In FIG. 6, the parts corresponding to those of FIG. 2 are represented by the same reference numerals. That is, the encoder 31 basically has the same construction as the encoder 1 of FIG. 2 except that a complexity calculation circuit 41 and a target code amount calculation circuit 42 are newly provided.

In the encoder 31, the same processing as the second path of the encoder 1 of FIG. 2 is performed to encode a picture except that the target code amount is set in the step 1 of the TM5 as described above. That is, in the complexity calculation circuit 41, the complexity of each of the I-picture, the P-picture and the B-picture is calculated on the basis of the data accumulative amount of the buffer 17, that is, the occurrence code amount and the quantizing index which is output from the quantizing index determining circuit 25, and then supplied to the target code amount calculation circuit 42. On the basis of the complexity from the complexity calculation circuit 41, the target code amount calculation circuit 42 sets a target code amount of a frame to be next coded, and outputs it to the quantizing index determining circuit 25. In the quantizing index determining circuit 25, the quantizing index every macroblock is set on the basis of the target code amount from the target code amount calculation circuit 42 as described with reference to FIGS. 3 and 4, and then supplied to the quantizing circuit 15.

As described above, in the case where the quantizing index MQUANT (quantizing step) of the macroblock is set on the basis of Q_index serving as the first variable for making the occurrence code amount of the coded data obtained by coding the picture with a predetermined target code and activity ACT serving as the second variable corresponding to the complexity of the picture, Q index is set to a fixed value during the coding of the picture of one frame, so that the picture quality of the decoded picture can be prevented from being deteriorated due to the variation of the quantizing step for the rate control.

Further, the error of the occurrence code amount with respect to the target code amount, and also Q_index used to set the quantizing step of a next frame in accordance with the accumulative value of the error are determined, so that the occurrence code amount to the overall picture can be substantially set to the desired target code amount.

As described above, when Q_index is fixed during the coding of the picture of one frame, it can be estimated that in many cases the occurrence code amount of one frame does not coincide with the target code amount. However, when the 2-path encoding is performed, it is sufficient that the overall occurrence code amount is finally coincident with the target code amount. Accordingly, if the condition imposed by the VBV buffer is satisfied, it is little necessary to alter Q index during the coding of the picture of one frame to make the occurrence code amount of one frame coincident with the target code amount. That is, when the condition imposed by the VBV buffer is satisfied, there is no problem if Q_index is fixed during the coding of the picture of one frame.

When Q_index is fixed during the coding of one frame, in general the occurrence code amount of one frame is not coincident with the target code amount thereof. Therefore, it is preferable that the target code amount is determined with keeping such a margin that the VBV buffer suffers no underflow even when the occurrence code amount exceeds the target code amount to some degree (for example, even when the occurrence code amount exceeds the target code amount by about 20%).

However, in this case, when Q_index is fixed during the coding of the picture of one frame (a mode in which Q_index is fixed during the coding of the picture of one frame as described above is hereinafter suitably referred to as an intra-frame fixing Q mode), there is not any guarantee that the error of the occurrence code amount from the target code amount for one frame is surely limited within a predetermined range.

Figure 4:
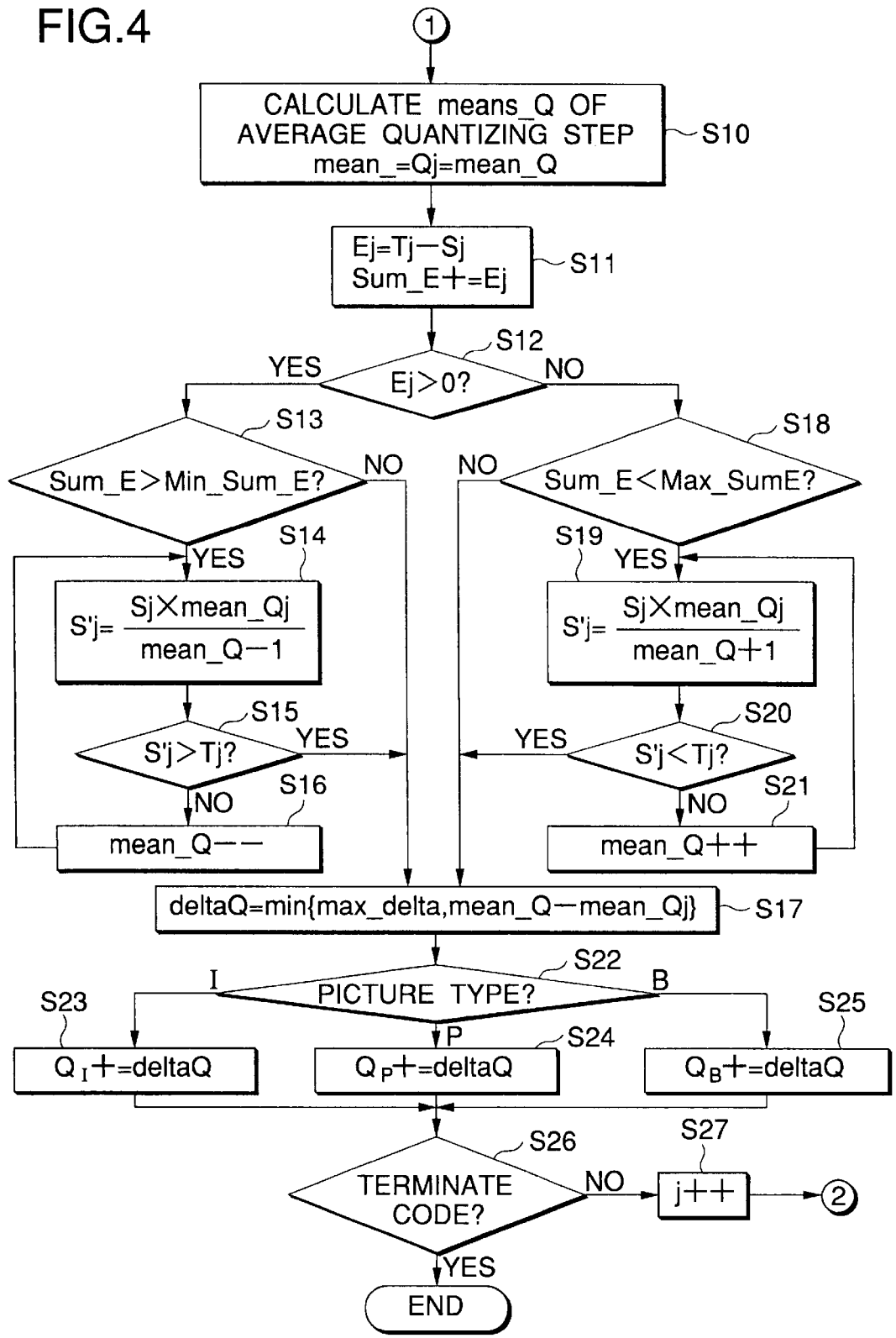
FIG. 4 is a flowchart sequential to the flowchart of FIG. 3.

That is, in the infra-frame fixing Q mode, the target code amount is determined with a predetermined margin as described above, or the decrement or increment of mean_Q is restricted by the judgment processing of each of the steps S15 and S20 of FIG. 4, whereby the underflow of the VBV buffer can be basically prevented. However, there is no guarantee that it can be surely prevented (the probability of the underflow of the VBV buffer is low, however, it is not equal to zero).

Therefore, in order to make the probability of the underflow of the VBV buffer closer to zero, there is a method of setting a larger margin for the target code amount to prevent the underflow of the VBV buffer even if the occurrence code amount is greatly larger than an estimated in the case where the intra-frame fixing mode is used.

However, when a larger margin is set for the target code amount and an undesirably small target code amount is set, the quantizing step is undesirably large and the picture quality of the decoded picture is deteriorated. On the other hand, when a small margin is set and the target code amount is not set to a sufficiently small value, the VBV buffer suffers underflow. Accordingly, by merely setting a margin for the target code amount, it is difficult to enhance the picture quality of the decoded picture (prevent deterioration of picture quality) and surely prevent the underflow of the VBV buffer.

Therefore, in order to enhance the picture quality of the decoded picture and make the probability of the underflow of the VBV buffer closer to zero, the encoder 1 of FIG. 1 (the same is applied to the encoder 31 of FIG. 6) is designed so that the operation mode is adaptively set to the intra-frame fixing Q mode for fixing Q_index during the coding of the picture of one frame and the mode for making Q_index variable during the coding of the picture of one frame like the prior art (hereinafter suitably referred to as a intra-frame rate control mode) to perform the quantization (a method of adaptively switching the operation mode in the quantization process as described above is hereinafter suitably referred to as an adaptive switching method).

That is, the intra-frame fixing Q mode is set in the case where the probability in which the VBV buffer suffers underflow approaches to zero unlimitedly although the error of the occurrence code amount from the target code amount is large, and the intra-frame rate control mode is set in the case where the probability of the underflow of the VBV buffer is high when the error of the occurrence code amount from the target code amount is increased (in the case where the VBV buffer suffers underflow when the target code amount and the occurrence code amount are not substantially coincident with each other).

In this case, it is assumed that the intra-frame rate control mode is set in the following three cases while the intra-frame fixing Q mode is set in the other cases.

That is, the intra-frame rate control mode is set, first in the case where Q_index is extremely small, secondly in the case where the occurrence code amount on a frame basis exceeds the target code amount by a predetermined rate, and thirdly in the case where the bit rate in a predetermined period which is calculated from the total of the target code amounts in a predetermined period such as a period of GOP exceeds a predetermined threshold value such as the highest rate defined for the variable rate coding by a predetermined rate, and the intra-frame fixing Q mode is set in the other cases.

The reason why the intra-frame rate control mode is set in the above case is as follows.

That is, when Q_index is set to an extremely small value such as 1 or 2 in the case where a picture to be encoded is like a still picture which is flat and makes little motion, the quantization is performed on the basis of Q_index of the extremely small value such as 1 or 2 upon subsequent input of a complicated picture. In this case, there is a risk that the VBV buffer may suffer underflow by merely increasing the occurrence code amount extremely and encoding several frames (one frame, two frames or the like) of complicated pictures, and thus the occurrence code amount is set not to extremely increase by setting the intra-frame rate control mode even when the picture is changed from a flat picture to a complicated picture.

Figure 7:
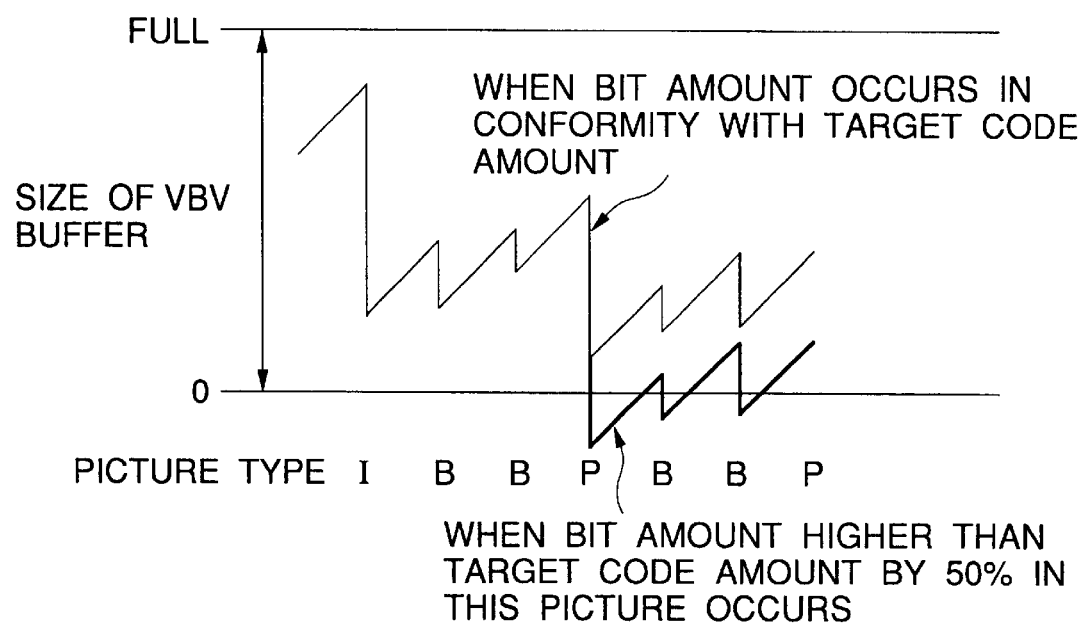
FIG. 7 is a diagram showing that a VBV buffer suffers underflow when an occurrence code amount is larger than a target code amount by a predetermined rate or more.

If the occurrence code amount is coincident with the target code amount as indicated by a narrow solid line in FIG. 7, the VBV buffer suffers no underflow. However, if the occurrence code amount exceeds the target code amount by a predetermined rate or more in a frame as indicated by a heavy line in FIG. 7, the VBV buffer may suffer underflow. The heavy line of FIG. 7 shows a case where the VBV buffer suffers underflow because the occurrence code amount exceeds the target code amount by 50% in a fourth P-picture frame from the left.

Therefore, in the case where the VBV buffer suffers underflow when it is assumed that the occurrence code amount exceeds the target code amount by a predetermined rate or more, the intra-frame rate control mode is set to make the occurrence code amount coincident with the target code amount.

The rate or more at which the occurrence code amount is assumed to exceed the target code amount, that is, the margin which is assumed to be added to the target code amount to equalize the addition to the code amount corresponding to the data read-out from the VBV buffer is preferably determined on the basis of Q_index or the like. This is because the occurrence code amount may be extremely increased when Q_index is small as described above, and thus it is preferable that the margin is set to a larger value as Q_index is smaller (for example, when Q_index is small or large, a margin of 100% or 50% of the target code amount is set).

Next, for example when the coding is performed at a variable rate like the 2-path encoding or the like, the bit rate of the coded data is dynamically varied. For example, in the MPEG 2, it is necessary that the maximum value of the bit rate which is taken by the system has been defined when the coding is performed at a variable rate, and the data accumulative amount of the VBV buffer is calculated on the basis of the maximum bit rate.

That is, the data accumulation into the VBV buffer is assumed to be performed at the maximum bit rate to calculate the data accumulation. Accordingly, when the bit rate of the coded data is sufficiently lower than the maximum bit rate, the supply amount of the coded data into the VBV buffer is sufficiently larger than the read-out amount therefrom, so that the data accumulative amount of the VBV buffer lingers around the storage capacity thereof. Therefore, the VBV buffer never suffers underflow except for a special case where coded data which is substantially equal to the storage capacity of the VBV buffer occurs suddenly. On the other hand, when the bit rate of the coded data is equal or near to the maximum bit rate, the supply amount of the coded data into the VBV buffer is equal to or somewhat larger than the read-out amount therefrom. Therefore, for example if frames in which the occurrence code somewhat exceeds the target code are sequential, the error of the occurrence code amount from the target code amount is accumulated, and thus the data accumulation amount of the VBV buffer is reduced, so that the risk that the VBV buffer suffers underflow is heightened.

Figure 8:
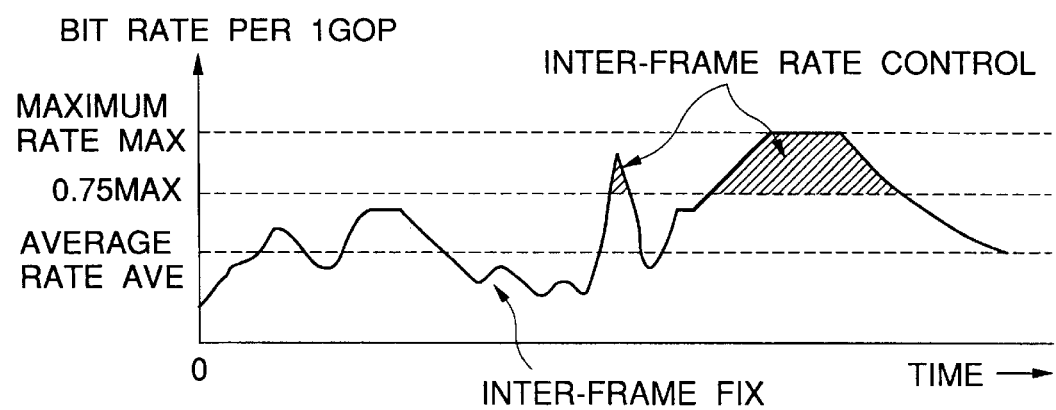
FIG. 8 is a diagram showing time variation of the average value of a bit rate of 1GOP.

Therefore, for example, the bit rate in a GOP (the average bit rate or the like) is calculated from the total of the target code amounts in the period of the GOP, and when the bit rate exceeds the maximum bit rate by a predetermined rate as shown in FIG. 8 (in FIG. 8, it is set to 75%) or more, the intra-frame rate control mode is set to make the occurrence code amount substantially coincident with the target code amount.

When only the intra-frame rate control mode is applied, the deterioration of the picture quality of the decoded picture occurs as described above. However, according to the adaptive switching method of adaptively switching the intra-frame fixing Q mode and the intra-frame rate control mode to each other as described above, the decoded picture having substantially the same picture quality as the case where only the intra-frame fixing Q mode is used can be obtained. The reason is as follows.

That is, in the case of the adaptive switching method, the intra-frame rate control mode is set in any one of the first to 3 cases as described above, and these three cases are mainly classified into the case where Q_index is extremely small and the case where the occurrence code amount is extremely large. The case where Q_index is extremely small basically corresponds to the case where a flat picture (simple picture) is encoded. With respect to the flat picture, no critical problem originally occurs on the picture quality of the decoded picture thereof. Further, the case where the occurrence code amount is extremely large basically corresponds to the case where a complicated picture is encoded. With respect to the complicated picture, even when Q_index is varied during the coding of one frame, the difference in Q_index between adjacent blocks has little effect on the picture quality of the decoded picture. Accordingly, according to the adaptive switching method, the decoded picture having substantially the same picture quality as the case where only the intra-frame fixing Q mode is used can be obtained.

Further, according to the adaptive switching method, the intra-frame rate control mode is set to prevent the underflow of the VBV buffer more surely, however, any special consideration on the overflow of the VBV buffer is not needed. This is because when the VBV buffer is about to suffer overflow, it is sufficient to temporarily stop the supply of data into the VBV buffer, that is, the read-out of coded data from the recording medium 3 or the transmission of coded data through the transmission path 4.

Next, the processing of the quantizing circuit 15 and the quantizing index determining circuit 25 of FIG. 2 when the quantization is performed according to the adaptive switching method as described above will be described with reference to the flowcharts of FIGS. 8 to 11.

Figure 9:
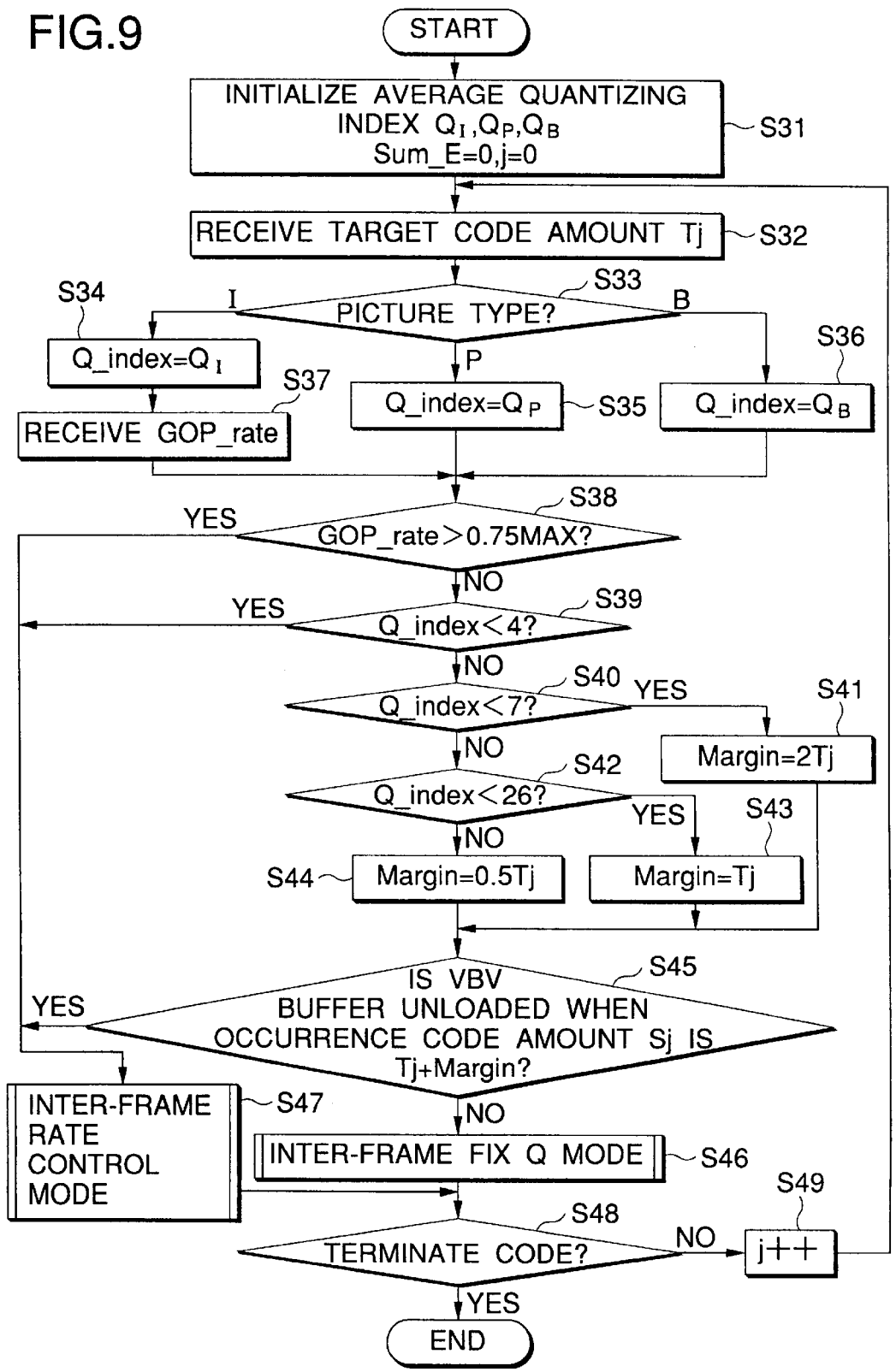
FIG. 9 is a flowchart showing the processing of the quantizing circuit 15 and the quantizing index determining circuit 25 when quantization is performed on the basis of an adaptive switching method.

In this case, in the quantizing index determining circuit 25, the same kinds of processing as the steps S1 to S6 of FIG. 3 are performed in steps S31 to S36 of FIG. 9, respectively.

After the processing of the step S34, that is, when the picture type of the frame serving as the coding target is an I-picture and $Q_I$ is set to Q_index, the processing goes to step S37 in which the quantizing index determining circuit 25 receives GOP_rate from the external computer 2, and then the processing goes to step S38.

That is, it is assumed that only one frame of I-picture is contained in GOP (this is the usual case), the I-picture is first coded in the frames constituting GOP. According to the adaptive switching method, the external computer 2 calculates the total of the target code amounts of the respective frames constituting the GOP and also calculates the average bit rate GOP_rate over the overall GOP from the total, and then outputs the calculation result to the quantizing index determining circuit 25. In step S37, the average bit rate GOP_rate of the GOP which is supplied from the external computer as described above is received, and then the processing goes to step S38.

After the processing of the steps S35 and S36, the processing goes to step S38, and it is judged by the quantizing index determining circuit 25 whether the newest GOP_rate received from the external computer 2 is higher than 75% of the maximum value MAX defined as the bit rate of the encoder 1 (hereinafter suitably referred to as the maximum rate). If GOP_rate is larger than 0.75MAX in step S38, that is, if this case meets the third case as described above, the processing goes to step S47 in which the quantizing index determining circuit 25 sets the intra-frame rate control mode to perform the quantizing processing corresponding to the mode. After the processing is finished, the processing goes to step S48.

In this embodiment, the bit rate of the coded data is calculated on a GOP basis. Therefore, when the bit rate GOP_rate thereof is higher than 0.75MAX, the intra-frame rate control mode is set of al the frames constituting the GOP. Accordingly, by calculating the bit rate of coded data on a frame basis, that is, calculating the average value of the bit rate on a frame basis to judge the level of the average value, the intra-frame rate control mode is set for the frames constituting the GOP, however, the intra-frame fixing Q mode may be set for the other frames.

On the other hand, if it is judged in step S38 that GO_rate is not larger than 0.75MAX, the processing goes to step S39 to judge it in the quantizing index determining circuit 25 whether Q_index is smaller than an extremely small value such as 4, for example. If it is judged in step S39 whether Q_index is smaller than 4, that is, if Q_index is equal to any one of 1 to 3 and this case corresponds to the first case as described above, the processing goes to step S47 to set the intra-frame rate control mode. Further, if it is judged in step S39 whether Q_index is not less than 4, the value of Q_index is judged in the following processing, and the margin which is to be added to the target code amount, the addition value being set as the code amount which is assumed as the read-out amount of the data from the VBV buffer.

That is, if it is judged in step S39 whether Q_index is not less than 4, the processing goes to step S40 to judge whether Q_indx is smaller than a relatively small value, for example, 7. If it is judged in step S40 that Q_index is less than 7, that is, if Q_index is equal to any one of relatively small values, 4 to 6, the processing goes to step S41 and a relatively large value, for example, $2T_j$ (200% of the target code amount) is set as Margin, and then the processing goes to step S45. Further, it is judged in step S40 whether Q_index is not less than 7, the processing goes to step S42 to judge whether Q_index is less than an intermediate value, for example, 26.

If it is judged in step S42 that Q_index is less than 26, that is, Q_index is equal to any one of intermediate values of 7 to 25, the processing goes to step S43 in which an intermediate value, for example, $T_j$ (100% of the target code amount) is as Margin, and the processing goes to step S45. If it is judged in step S42 that Q_index is not less than 26, that is, if Q_index is equal to or more than 26, the processing goes to step S44 to set a small value, for example, $0.5T_j$ (50% of the target code amount), and then the processing goes to step S45.

Here, in the MPEG, the value which is obtainable as Q_index is set to 1 to 31, and thus the case where Q_index is equal to a large value above 26 means that Q_index is equal to any one of 26 to 31.

It is judged in step S45 whether the underflow occurs on the assumption that the occurrence code amount $S_j$ of the j-th frame serving as the coding target is equal to the sum of the target code amount $T_j$ thereof and margin Margin (the code amount $T_j$+Margin). If it is judged in step S45 that the VBV buffer suffers underflow when the occurrence code amount $S_j$ is assumed as (the code amount $T_j$+Margin), that is, if the equation (the data accumulation amount of the VBV buffer)−(the code amount $T_j$ +Margin)<0 is satisfied, the processing goes to step S47 to set the intra-frame rate control mode.

On the other hand, if it is judged that the VBV buffer suffers no underflow even when the occurrence code amount $S_j$ is assumed to be equal to (the code amount $T_j$+Margin), that is, this case does not correspond to any one of the first to third cases, the processing goes to step S46 in which the quantizing index determining circuit 25 sets the intra-frame fixing Q mode to perform the quantization processing corresponding to the mode. After the processing is ended, the processing goes to step S48, and it is judged whether the terminate code is received as in the case of the step S26 of FIG. 4. If it is judged that the terminate code is not received, the processing goes to step S49 to increment j by only 1, and returns to step S32. Further, if it is judged in step S48 that the terminate code is received, the processing is ended.

Figure 10:
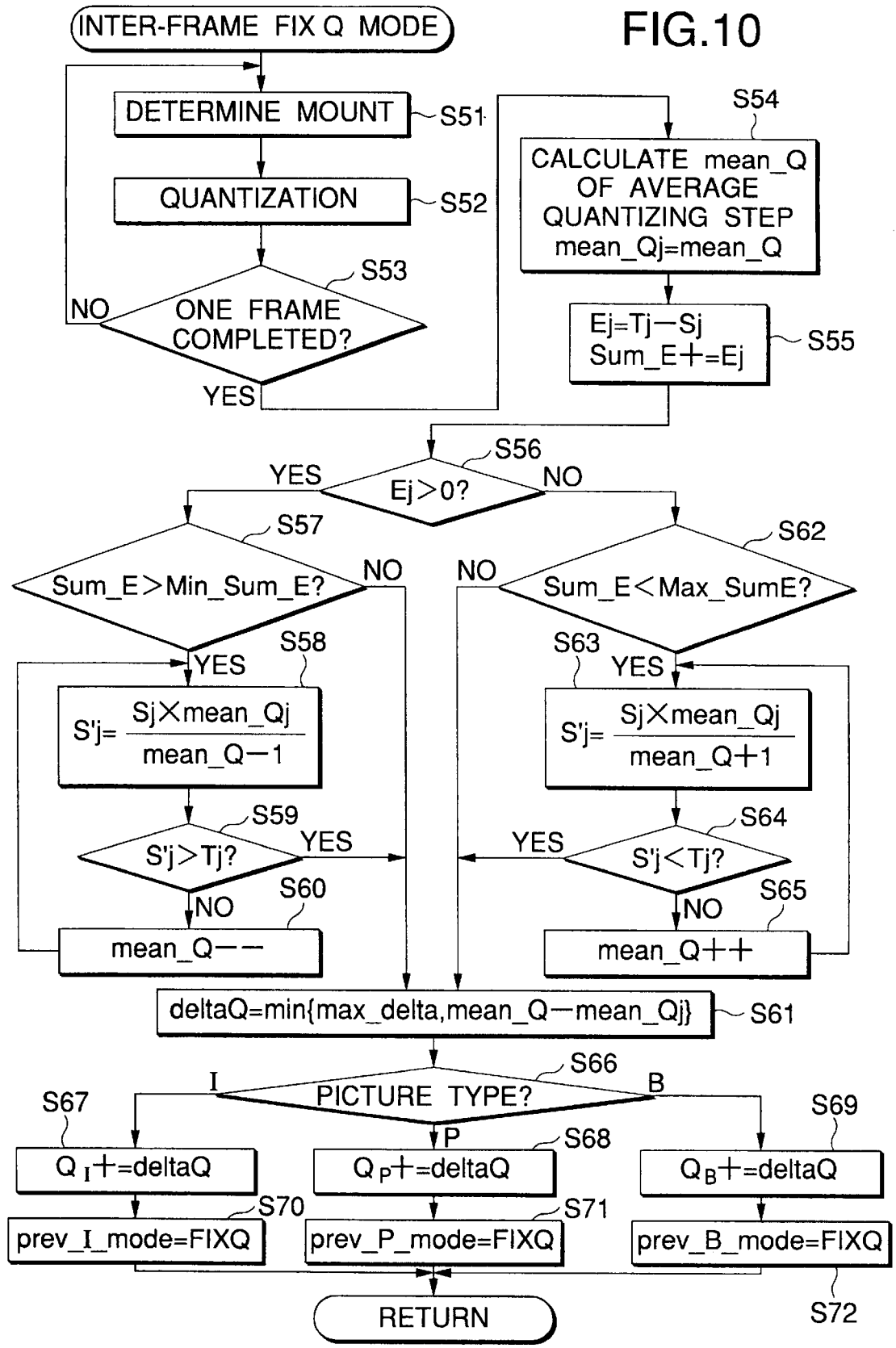
FIG. 10 is a flowchart showing the detailed processing of an in-frame fixing Q mode in step S46 of FIG. 9.

Next, the flowchart of FIG. 10 shows the detailed processing of the intra-frame fixing Q mode in step S46 of FIG. 9.

In this case, the same processing as the steps S7 to S9 of FIG. 3 and the steps S10 to S25 of FIG. 4 is performed in steps S51 to S69.

As in the case of the steps S23 to S25 of FIG. 4, after new $Q_I$, $Q_P$, or $Q_B$, is set, the processing goes to S70 to S72 respectively in which FIXQ representing the intra-frame fixing Q mode is set to variables prev_I_mode, prev_P_mode and prev_B_mode for storing the operation mode which are set to quantize the I-picture, the P-picture or the B-picture, respectively, an then the processing returns.

Next, the flowchart of FIG. 11 shows the detailed processing of the intra-frame rate control mode in step S47 of FIG. 9.

In the intra-frame control mode, the quantization step is set while Q_indx is varied during the coding of one frame to perform the quantization as in the case of TM5.

That is, in step S81, the picture type of the frame serving as the coding target is first judged by the quantizing index determining circuit 25. If it is judged in step S81 that the picture type is an I-picture, a P-picture or a B-picture, the processing goes to step S82, S83 or S84 respectively to judge the operation mode which is set for the quantization of the previous I-picture, P-picture or B-picture.

That is, in the respective steps S82 to S84, it is judged whether FIXQ is set to prev_I_mode, prev_P_mode and prev_B_mode respectively. If in the respective steps S82 to S84 it is judged that FIXQ is set to prev_I_mode, prev_P_mode and prev_B_mode respectively, that is, if the previous I-picture, P-picture or B-picture is quantized by the intra-frame fixing Q mode, the processing goes to steps S85 to S87 respectively to initialize the virtual buffers $d_I$, $d_P$ and $d_B$ which are used in the step S2 of TM5 for the I-picture, P-picture and B-picture, respectively.

Here, the initialization of the virtual buffers $d_I$, $d_P$ and $d_B$ is performed according to the following equation, for example.

$$d_I=Q_I\times r/31, d_P=Q_P\times r/31, d_B=Q_B\times r/31$$

wherein 31 which is the denominator of the above equation is the maximum value of Q_index. Further, r is represented by 2×Bit_rate/Picture_rate, and Bit_rate and Picture_rate represent the bit rate and the picture rate, respectively.

After the virtual buffers $d_I$, $d_P$ and $d_B$ for the I-picture, the P-picture and the B-picture are initialized in the respective steps S85 to S87, in any case the processing goes to step S88.

Further, If in the respective steps S82 to S84 it is judged that FIXQ is not set to prev_I_mode, prev_P_mode and prev_B_mode respectively, the processing skips the respective steps S85 to S87 and goes to step S88 to determine the quantizing step MQUANT for quantizing the macroblock. That is, the quantizing index determining circuit 25 sets the quantizing index MQUANT of the macroblock serving as the coding target on the basis of the first variable Q index for making the occurrence code amount coincident with the target code amount $T_j$, and the activity ACT from the activity detection circuit 24 which is the second variable corresponding to the complexity of the macroblock serving as the coding target, and outputs it to the quantizing circuit 15. In the quantizing circuit 15, the value corresponding to the quantizing index MQUANT is set as the quantizing step which is used to quantizing the macroblock serving as the coding target.

When the quantizing step is set, the processing goes from step S88 to S89 to quantize the macroblock serving as the coding target by the quantizing step in the quantizing circuit 15, and then the processing goes to step S90. In step S90 it is judged whether the quantization of all the macroblocks constituting the j-th frame is completed. If the quantization is judged not to be completed, the processing goes to step S91 to renew the data accumulation amount of the virtual buffer $d_I$, $d_P$ or $d_B$ in accordance with the difference between the target code amount and the occurrence code amount until macroblocks which have been already quantized in all the macroblocks constituting the j-th frame, and then the processing returns to step S88. Subsequently, the same processing is repetitively performed on the macroblocks which have not yet been quantized.

That is, in the intra-frame rate control mode, Q_index is suitably changed so that the occurrence code amount $S_j$ is coincident with the target code amount $T_j$ on the basis of the data accumulation amount of the virtual buffer $d_I$, $d_P$ or $d_B$ (corresponds to the step S2 of TM5). The final quantizing index MQUANT of each macroblock is determined on the basis of Q_index thus suitably changed and the activity ACT which varies in accordance with the complexity of the macroblock serving as the coding target (corresponds to the step S3 of TM5. Accordingly, in this case, the quantizing index MQUANT every block, that is, the quantizing step every block varies in accordance with the complexity of the picture, and also varies for the rate control, so that the occurrence code amount $S_j$ is coincident with the target code amount $T_j$ and thus the underflow of the VBV buffer can be surely prevented.

On the other hand, if it is judged in step S90 that the quantization of all the macroblocks constituting the j-th frame is completed, the processing goes to step S92 to set Q_index used to quantize the final macroblock of the macroblocks constituting the j-th frame to a variable last_$Q_j$ for keeping Q_index.

In place of Q_index itself, the quantizing index which is calculate from Q_index and he activity ACT may be set to last_$Q_j$. However, in steps S95 to S97 as described later, last_$Q_j$ is set to $Q_I$, $Q_P$ or $Q_B$, and used as Q_index when the first macroblock of a frame to be next encoded is quantized, so that Q_index itself is preferably set.

Further, in the above embodiment, Q_index for the last macroblock is set to last_$Q_j$, however, the average value or the like of Q_index for all the macroblocks of one frame may be set.

After the processing of step S92, the processing goes to step S93 to calculate $E_j$ and Sum_E as in the case of the step S11 of FIG. 4, and then the processing goes to step S93. In step S93, the picture type of the next frame, that is, the (j+1)-th frame is judged. If in step S93 it is judged that the picture type of the (j+1)-th frame is judged to be an I-picture, P-picture or B-picture, the processing goes to steps S95, S96 and S97 respectively so that Last_$Q_j$ obtained in step S92 is set to $Q_I$, $Q_P$ and $Q_B$ respectively, and the processing goes to steps S98, S99 and S100.

In each of the steps S98 to S100, RC representing the intra-frame rate control mode is set to a variable prev_I_mode, prev_P_mode or prev_B_mode for storing the operation mode which is set to quantize the I-picture, the P-picture or the B-picture which is the picture of the j-th frame, and then the processing returns.

As described above, the intra-frame fixing Q mode and the intra-frame rate control mode are adaptively set. Therefore, the picture quality of the decoded picture can be enhanced, and the underflow of the VBV buffer can be surely prevented.

The quantization based on the above-described adaptive switching method is applicable to a device for encoding a picture with one path by a feedback type rate control shown in FIG. 5.

The foregoing description is made on the case where the present invention is applied to the picture coding device for encoding pictures at a variable rate. However, the present invention may be applied to the coding at a fixed rate.

As described above, the present invention may be applied to any case of the case where the 2-path encoding is performed and the case where the coding is performed once, however, it is more effective when the present invention is applied to the 2-path encoding.

In the embodiment shown in FIG. 1, the target code amount is transmitted from the external computer 2 to the encoder 1 to determine the quantizing index in the encoder 1. However, the quantizing index is determined in the external computer 2, and transmitted to the encoder 1.

In this embodiment, $Q_I$, $Q_P$, $Q_B$ for the I-picture, the P-picture and B-picture are independently, however, $Q_I$, $Q_P$ for the I-picture and the P-picture may be made common (have the same value). That is, it is known that the picture quality is better by setting $Q_I$, $Q_P$ to the same value. Usually, only one I-picture exists in one GOP, and thus after $Q_I$ is determined (changed), the $Q_I$ is not used for the I-picture of a next GOP. Further, if $Q_I$ and $Q_P$ are set to the same value, it is unnecessary to make a classification for the respective I-picture and P-picture and renew $Q_I$, $Q_P$, and thus the processing speed can be enhanced. For the foregoing reason, it is preferable that $Q_I$ and $Q_P$ are set to the same value.

Further, in this embodiment, the DCT coefficients output from the DCT circuit 14 are quantized in the quantizing circuit 15, however, the present invention may be applied to the case where the orthogonal transform coefficients other than the DCT coefficients.

According to the picture coding device and the picture coding method of the present invention, the quantizing step is set on the basis of the first variable with which the occurrence code amount of the coded data obtained by encoding the picture is made coincident with the predetermined target code amount, and the second variable corresponding to the complexity of the picture, and the first variable is set to the fixed value during the coding of the picture of one frame. Accordingly, the picture quality of the decoded picture can be prevented from being deteriorated.

According to the picture transmitting device and the picture transmitting method of the present invention, the coded data are obtained by setting the quantizing step on the basis of the first variable with which the occurrence code amount of the coded data obtained by encoding the picture is made coincident with the predetermined target code amount, and the second variable corresponding to the complexity of the picture, and setting the first variable to the fixed value during the coding of the picture of one frame. Accordingly, the picture quality of the decoded picture can be prevented from being deteriorated.

Further, on the recording medium of the present invention are recorded the coded data which are obtained by setting the quantizing step on the basis of the first variable with which the occurrence code amount of the coded data obtained by encoding the picture is made coincident with the predetermined target code amount and the second variable corresponding to the complexity of the picture, and setting the first variable to the fixed value during the coding of the picture of one frame. Accordingly, the picture quality of the decoded picture can be prevented from being deteriorated.

According to the picture coding device and the picture coding method of the present invention, the quantizing step is set on the basis of the first variable with which the occurrence code amount of the coded data obtained by coding the picture is made coincident with the predetermined target code amount, and the second variable corresponding to the complexity of the picture, and the fixing or variable mode for fixing or making variable the first variable during the coding of the picture of one frame is adaptively set. Accordingly, not only the picture quality of the decoded picture can be enhanced, but also the occurrence code amount can be made coincident with the target code amount.

According to the picture transmitting device and the picture transmitting method of the present invention, the coded data are obtained by adaptively setting a fixing or variable mode for setting the first variable to a fixed or variable value during a coding processing of the picture of one frame when a quantizing step is set on the basis of the first variable for making the occurrence code amount of the coded data of a picture with a prescribed target code amount in a process of quantizing an orthogonal transform coefficients with the quantizing step. Accordingly, the decoded picture having excellent picture quality can be obtained form the coded data.

On a recording medium according to the present invention are recorded coded data which are obtained by adaptively setting a fixing or variable mode for setting a first variable to a fixed or variable value during a coding processing of the picture of one frame when a quantizing step is set on the basis of the first variable for making coincidence between an occurrence code amount of coded data of a picture and a prescribed target code amount in a process of quantizing an orthogonal transform coefficients with the quantizing step. Accordingly, the decoded picture having excellent picture quality can be obtained from the coded data.

What is claimed is:

1. A picture coding device, for encoding a picture, comprising:

orthogonal transform means for orthogonally transforming the picture and outputting orthogonal transform coefficients;

quantizing means for quantizing the orthogonal transform coefficients by a predetermined quantizing step, wherein said quantizing means sets the quantizing step on the basis of a first variable for making the occurrence code of coded data obtained by encoding the picture with a predetermined target code amount, and a second variable corresponding to the complexity of the picture, the first variable being set to a fixed value during the coding of the picture of one frame; and prediction means for predicting an occurrence code amount when a picture to be next coded is coded by changing the first variable, wherein the first variable is changed on the basis of the occurrence code amount which is predicted by said prediction means, wherein said prediction means predicts the occurrence code mounted on the assumption that the complexity of a picture which is currently encoded is identical to the complexity of a picture to the next encoded.

2. The picture coding device as claimed in claim 1, wherein said setting means calculates a bit rate in a predetermined period from the total target code amount in a predetermined period, and sets the variable mode when the bit rate is above a predetermined threshold value or the fixing mode when the bit rate is not above a predetermined threshold value.

3. A picture coding device, for encoding a picture, including:

orthogonal transform means for orthogonally transforming the picture and outputting orthogonal transform coefficients;

quantizing means for quantizing the orthogonal transform coefficients with a predetermined quantizing step, wherein when said quantizing means sets the quantizing step on the basis of a first variable for making the occurrence code amount of coded data obtained by encoding the picture coincident with a predetermined target code amount, and a second variable corresponding to the complexity of the picture, said picture coding device further includes setting means for adaptively setting a fixing or variable mode for setting the first variable to a fixed or variable value;

said picture being subjected to MPEG (Moving Picture Experts Group) coding, and said setting means sets any one of the fixing mode or the variable mode on the basis of the data accumulation amount of a VBV (Video Buffering Verifier) buffer;

wherein said setting means sets the variable mode when said VBV buffer suffers under flow in the case where it is assumed that the code amount obtained by adding the target code amount with a predetermined margin said VBV buffer; and wherein said setting means sets the margin on the basis of the first variable.

* * * * *